United States Patent [19]

Cooper et al.

[11] Patent Number: 5,646,947
[45] Date of Patent: Jul. 8, 1997

[54] MOBILE TELEPHONE SINGLE CHANNEL PER CARRIER SUPERFRAME LOCK SUBSYSTEM

[75] Inventors: Raymond R. Cooper, Baltimore; Joseph B. Bronder, Elkridge, both of Md.

[73] Assignee: Westinghouse Electric Corporation, Pittsburgh, Pa.

[21] Appl. No.: 411,048

[22] Filed: Mar. 27, 1995

[51] Int. Cl.$^6$ ................................................ H04J 3/06
[52] U.S. Cl. ......................... 370/510; 370/514; 375/366
[58] Field of Search ............................. 370/509, 510, 370/511, 514; 375/366

[56] References Cited

U.S. PATENT DOCUMENTS

| | | | |
|---|---|---|---|
| 3,825,899 | 7/1974 | Haeberle et al. | 340/172.5 |
| 4,298,979 | 11/1981 | Dobyns et al. | 370/104 |
| 4,665,533 | 5/1987 | Tomikawa | 375/106 |
| 4,768,192 | 8/1988 | Pattavvina et al. | 370/100 |
| 4,796,282 | 1/1989 | Yoshida | 370/510 |
| 4,847,877 | 7/1989 | Besseyre | 375/116 |
| 5,007,088 | 4/1991 | Ooi et al. | 370/514 |
| 5,251,239 | 10/1993 | Turban et al. | 375/114 |
| 5,550,831 | 8/1996 | Tanahashi | 370/514 |

FOREIGN PATENT DOCUMENTS

| | | |
|---|---|---|
| 0453876 | 10/1991 | European Pat. Off. . |
| 3013554 | 10/1980 | Germany . |
| 2098834 | 11/1982 | United Kingdom . |

OTHER PUBLICATIONS

Choi, Doo Whan, "Frame Alignment In a Digital Carrier System—A Tutorial" IEEE Communications Magazine, Feb. 1990, pp. 47–54.

Primary Examiner—Melvin Marcelo

[57] ABSTRACT

A superframe lock subsystem includes a correlator which searches for and identifies a first unique word indicative of a frame boundary within a received bit stream during an initial acquisition state. A controller subsequently predicts frame boundaries in accordance with the first unique word. In a tentative frame lock state, the correlator searches for and determines if a second unique word exists at the frame boundary subsequent the frame boundary which corresponds to the first unique word. If the second unique word is determined to exist at the corresponding frame boundary and if a single frame duration separates the first and second unique words, the superframe lock subsystem enters a frame lock state. During the frame lock state, information of the corresponding frames is processed. The correlator searches for and determines if a carrier wave sequence indicative of a superframe boundary exists in the received bit stream at the frame boundary immediately following the frame boundary which corresponds to the second unique word. If the carrier wave sequence exists at the predicted frame boundary, the correlator searches for and determines if a third unique words exists in the received bit stream immediately after the carrier wave sequence. Upon determination that the third unique word exists subsequent the carrier wave sequence, the superframe lock subsystem enters a superframe lock state wherein the correlator searches for and detects only unique words at subsequent predicted frame boundaries to maintain superframe lock.

25 Claims, 8 Drawing Sheets

FIG.3
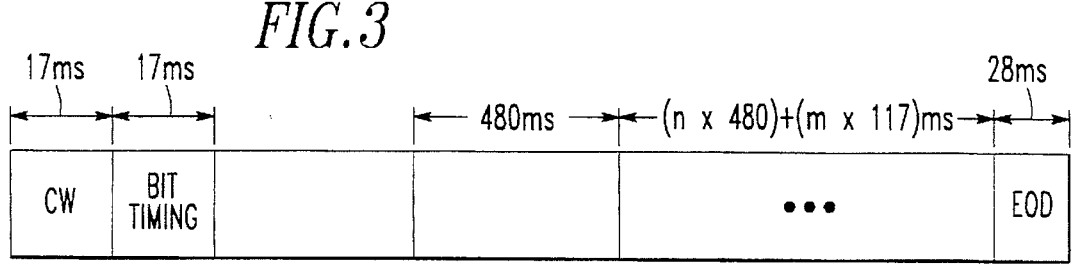
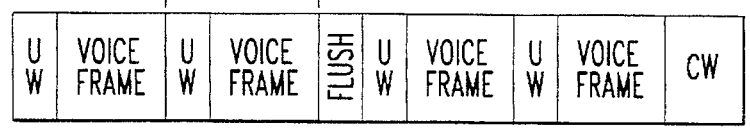
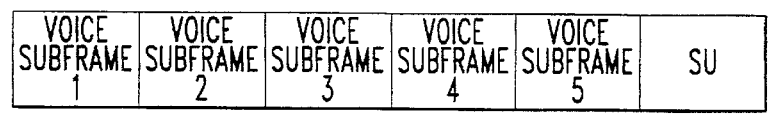
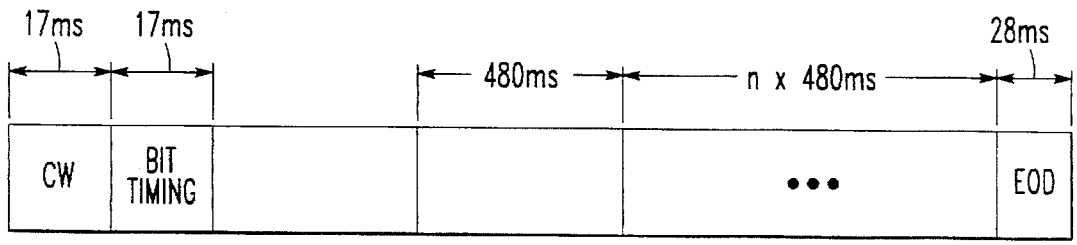
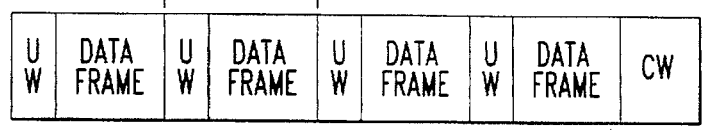
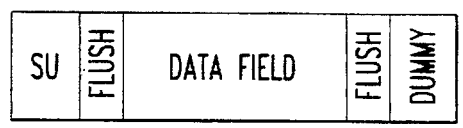
FIG.4

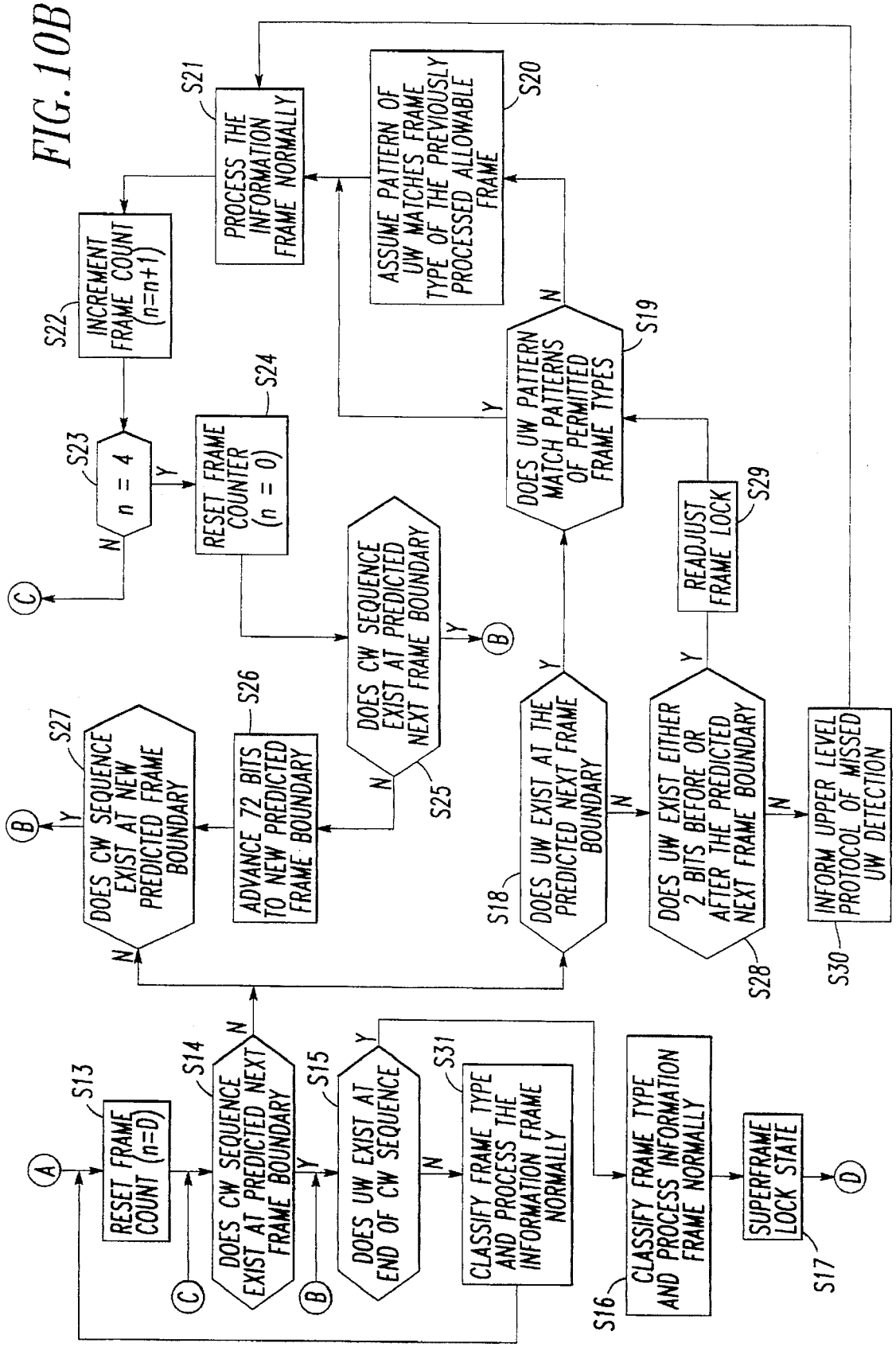

MOBILE TELEPHONE SINGLE CHANNEL PER CARRIER SUPERFRAME LOCK SUBSYSTEM

FIELD OF THE INVENTION

The present invention relates to a method and apparatus for acquiring and tracking frames and superframes of a demodulated bit stream in a digital carrier type communications system. More specifically, the present invention relates to a superframe lock subsystem for a mobile satellite-mobile terminal receiver which acquires and tracks the frames and superframes of a demodulated bit stream.

DESCRIPTION OF THE BACKGROUND ART

In any mobile communication system, the identification of frame boundaries and frame types are critical post-demodulation aspects of the processing performed by a superframe lock subsystem. The superframe lock subsystem must be capable of reliably acquiring, tracking and maintaining frame lock in minimal time regardless of the presence of signal fades and blockages and independent of frame type. The superframe lock subsystem must also be capable of recognizing changes in frame type, overcoming symbol slippage and extracting data as early as possible, all during poor channel conditions.

Frame alignment procedures conventionally utilize unique words embedded within the bit stream which identify frame boundaries. A frame alignment procedure generally consists of a search process and a confirmation process. Conventionally, a search process for a unique word comprises sequentially searching each bit position in each frame for a bit pattern which matches the unique word. In the presence of fades, blockages or poor channel conditions, the reproduced bit stream may be degraded. In a worst case, a search process for the unique word may comprise checking all the bit positions in each frame more than once. Accordingly, frame alignment in conventional superframe lock subsystems can be delayed appreciably. In addition to suffering from poor frame lock acquisition performance, the conventional superframe lock subsystem uses processing time uneconomically since the search process requires checking all bit positions in each frame at least once for unique words. Accordingly, a need in the art exists for a superframe lock subsystem which reliably and quickly acquires frame lock while conserving processor throughput.

SUMMARY OF THE INVENTION

Accordingly, it is an object of the present invention to provide a superframe lock subsystem and method of frame synchronization for a superframe lock subsystem which acquires and maintains lock in the presence of fades and blockages.

It is another object of the present invention to provide a superframe lock subsystem and method of frame synchronization for a superframe lock subsystem which acquires lock in minimum time despite occurrences of fades and blockages.

It is a further object of the present invention to provide a superframe lock subsystem and method of frame synchronization for a superframe lock subsystem which achieves lock in minimum time independent of the initial frame type.

It is still another object of the present invention to provide a superframe lock subsystem and method of frame synchronization for a superframe lock subsystem which recognizes changes in frame type that indicates the onset of call shutdown or switching to an alternate transmission mode.

It is a still further object of the present invention to provide a superframe lock subsystem and method of frame synchronization for a superframe lock subsystem which initiates data extraction at an earliest time in the acquisition process and maintains data extraction during periods of poor channel conditions.

It is yet a further object of the present invention to provide a superframe lock subsystem and method of frame synchronization for a superframe lock subsystem which modifies processing in various acquisition states to conserve throughput and reduce the probability of incorrect transition to an incorrect state.

Briefly, the foregoing and other objects are achieved by a superframe lock subsystem which searches for and detects a first unique word in the received data, predicts the location of frame boundaries in the received data based on the detected first unique word, searches for and detects if a second unique word exists in the received data at the predicted frame boundary immediately following the frame boundary corresponding to the detected first unique word, searches for and detects if a carrier wave sequence exists in the received data at the predicted frame boundary immediately following the frame boundary corresponding to the detected second unique word, searches for and detects if a third unique word exists in the received data immediately following the detected carrier wave sequence and maintains frame synchronization of the received data based upon unique words detected subsequent the detected third unique word.

The received data consists of superframes including a plurality of frames having frame information therein. A unique word in the received data is indicative of a frame boundary and a carrier wave sequence in the received data is indicative of a superframe boundary.

The superframe lock subsystem of the present invention includes a correlator which detects the presence of unique words and carrier wave sequences in the received data and provides a correlator output indicative thereof. A delay unit delays the received data and a frame classifier identifies frame type of the frames of the delayed received data in accordance with the correlator output and subsequently outputs frame type signals indicative of the identified frame type. A controller predicts frame boundaries based on a first unique word detected by the correlator in accordance with the correlator output, directs the correlator to search for subsequent unique words and carrier wave sequences at the predicted frame boundaries, generates timing signals based on the predicted frame boundaries, delays the received data and then subsequently processes the frame information of the received data as thereby delayed in accordance with the timing signals and the frame type signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 3 illustrates an SCPC in-band signalling voice mode channel format for a 6.4 Kbps speech CODEC having a 6.75 Kbps channel rate;

FIG. 4 illustrates a SCPC data mode or fax channel format having a 2.4 Kbps data rate (2400 baud) and a 6.75 Kbps channel rate;

FIGS. 10A-10C illustrate a flow chart detailing the processing steps of the superframe lock subsystem.

DETAILED DESCRIPTION OF PREFERRED EMBODIMENTS

Figure 1:
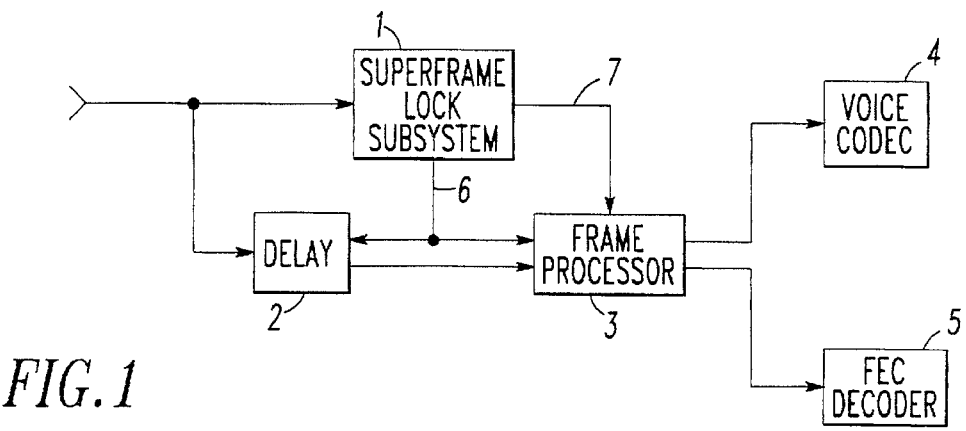
FIG. 1 is a general illustration of a mobile satellite-mobile terminal communications receiver, including post demodulation modem functions.

FIG. 1 is a general illustration of a mobile satellite (MSAT)-mobile terminal (MT) communications receiver, such as a mobile telephone for example, of an embodiment of the present invention including a superframe lock subsystem interconnected with various circuit elements related to post demodulation functions. Although the superframe lock subsystem 1 is described in relation to a mobile terminal receiver of a mobile satellite system, the superframe lock subsystem 1 is not necessarily limited for use with a mobile satellite system. The superframe lock subsystem 1 can be incorporated into various types of receivers or systems for acquiring and tracking a bit stream within the spirit and scope of the present invention.

As illustrated in FIG. 1, the demodulated bit stream, which will be described in detail hereinafter, is provided as input to the superframe lock subsystem 1 and delay element 2. The delayed bit stream output from delay element 2 is subsequently input to frame processor 3. As will be described in greater detail, superframe lock subsystem 1 determines frame type and frame boundary location and transmits corresponding timing information and control instructions along line 6 to delay element 2 and frame processor 3 and transmits frame type information along line 7 to frame processor 3. Frame processor 3 functions to perform various processing on the data within the frames of the bit stream in accordance with the frame type information and the timing information. Frame processor 3 subsequently delivers the processed bit stream to either voice coder/decoder (CODEC) 4 or forward error correction (FEC) decoder 5.

As noted above, the operations performed by frame processor 3 on the bits internal to the frames depend upon frame type. Frame processor 3 delivers the processed bit stream to FEC decoder 5 when the frames comprise data or in-band signaling units. FEC decoder 5 decodes the bit stream accordingly and provides as output decoded data or signalling units to an upper layer of the mobile terminal receiver. FEC decoder 5 functions to remove parity bits and perform Viterbi decoding, for example. On the other hand, frame processor 3 passes the bit stream to voice CODEC 4 when the frames comprise voice information. Voice CODEC 4 decodes the voice information and provides the decoded information to a digital/analog converter (not shown).

The frame and superframe structure of various bit frame formats of the mobile satellite system will now be described. The various formats described are exemplary and the frame and superframe formats are not necessarily limited to the illustrated embodiments.

The superframe lock subsystem 1 of the present invention acquires and tracks the frames and superframes of the bit stream in a single channel per carrier (SCPC) mode. The superframe lock subsystem applies a beforehand knowledge of the frame structure and exploits the embedded unique patterns called unique words, denoted as UW or UW' (the one's complement of UW), to lock onto the frame and superframe boundaries. Once a unique word indicative of a frame boundary is detected, frame type may be classified and the receiver can subsequently extract the information content of each frame while the superframe lock subsystem predicts the arrival times of subsequent frame and superframe boundaries.

Figure 2:
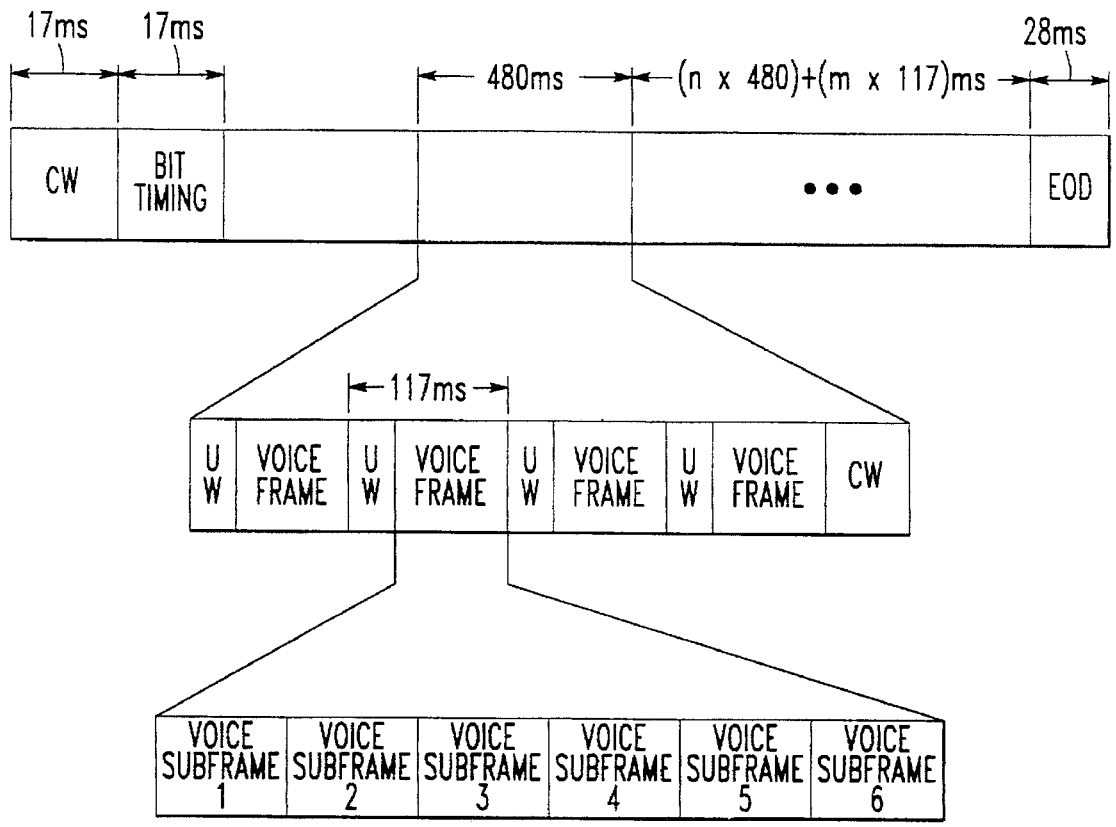
FIG. 2 illustrates an SCPC voice mode channel format for a 6.4 Kbps speech CODEC having a 6.75 Kbps channel rate.

FIG. 2 illustrates an SCPC voice mode channel format for a 6.4 Kbps speech CODEC having a 6.75 Kbps channel rate. As illustrated in FIG. 2, each bit stream begins with a preamble consisting of a carrier wave (CW) sequence of 116 bits and 17 msec duration and bit timing of 116 bits and 17 msec duration. Each voice frame contains 768 bits preceded by a unique word (hereinafter referred to as UW or UW'), the unique words having special 24 bit patterns. In the voice mode channel format, the 768 bits internal to each frame represent compressed digitized speech. Each voice frame including the corresponding UW marking the leading frame boundary has 117 msec duration and is comprised of 6 subframes. A superframe comprises 3240 bits having 480 msec duration and is separated into four voice frames, each including a UW. The superframe concludes with 72 bits of CW sequence which may be a string of unmodulated bits or zeros. The bit stream concludes with a 192 bit end of data (EOD) sequence of 28 msec duration comprising 8 successive UWs.

The 72 bit CW sequence ensures that the 6750 bps MSAT transmission rate matches the output rate of the corresponding data source, i.e. voice CODEC, data terminal or fax machine, over the 480 msec superframe period.

The EOD sequence announces the cessation of speech. Incidentally, when the speaker is idle, the system maintains superframe timing by activating the carrier and transmitting the preamble followed by the UW of the first frame of the next superframe.

FIG. 3 illustrates an SCPC in-band signalling voice mode channel format for a 6.4 Kbps speech CODEC having 6.75 Kbps channel rate. The format is similar to the SCPC voice mode channel format described above with respect to FIG. 2. A voice frame of the in-band signalling voice mode channel format illustrated in FIG. 3 may include a signalling unit. The UW of the particular frame which includes an in-band signalling unit is replaced with a corresponding UW'. The signalling information can only occupy the sixth subframe position of the corresponding frame.

FIG. 4 illustrates an SCPC data mode or fax channel format having a 2.4 Kbps data rate (2400 baud) and 6.75 Kbps channel rate. Each data frame includes a signalling unit followed by 8 flush bits, a data field, 12 flush bits and 44 dummy bits. A UW' is located at each leading frame boundary of a corresponding data frame.

Figure 5:
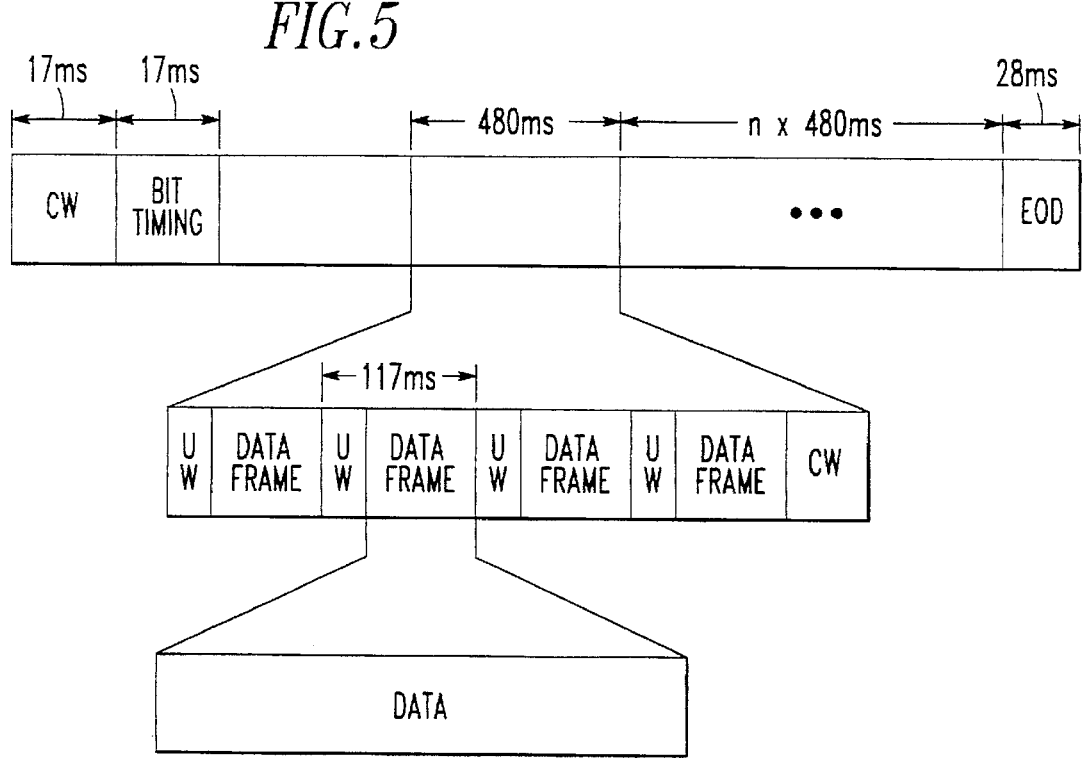
FIG. 5 illustrates an SCPC data mode channel format having a 4.8 Kbps data rate (4800 baud) and a 6.75 Kbps channel rate.

FIG. 5 illustrates an SCPC data mode channel format having a 4.8 Kbps data rate (4800 baud) and 6.75 Kbps channel rate. Each data frame comprises 768 bits. A UW is located at the leading frame boundary of a corresponding data frame.

Figure 6:
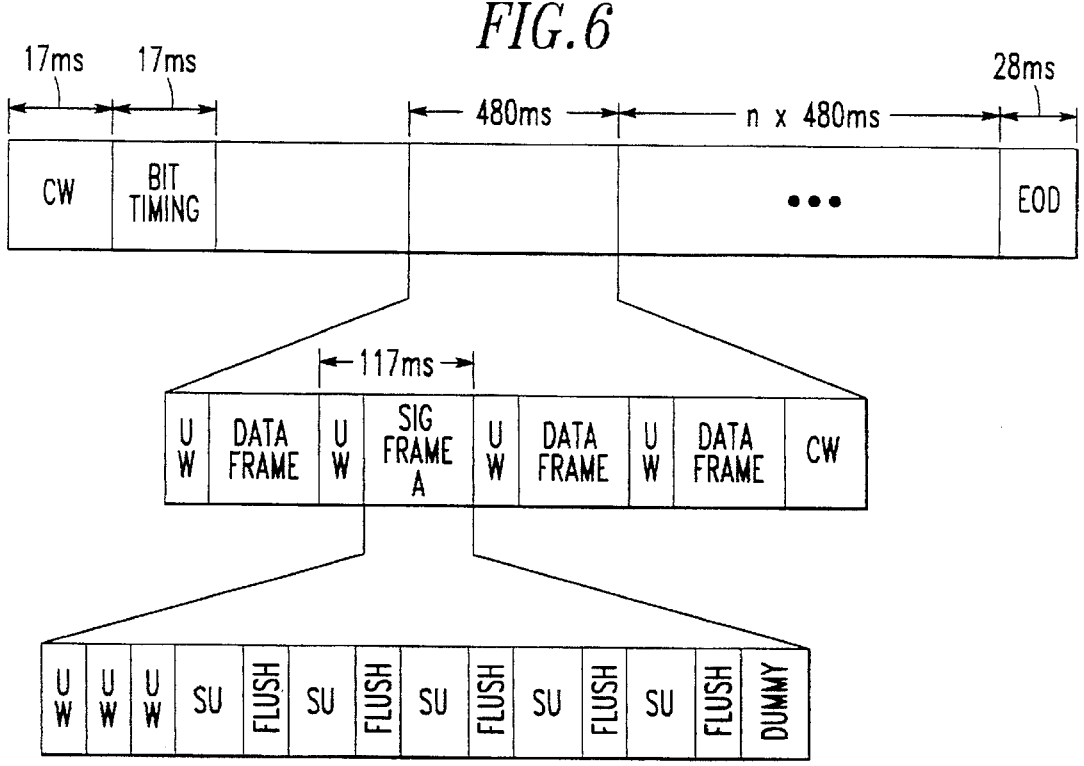
FIG. 6 illustrates an SCPC channel in-band signalling data mode channel format having a 4.8 Kbps data rate and a 6.75 Kbps channel rate.

FIG. 6 illustrates an SCPC channel in-band signalling data mode channel format having a 4.8 Kbps data rate and 6.75 Kbps channel rate. Each data frame has a UW at the leading frame boundary. The particular frame comprising the signalling units has a UW' at the leading frame boundary. The signalling frame itself begins with three 24-bit UW's and includes 5 signalling units of 128 bits, each followed by eight flush bits. The signalling frame concludes with 16 dummy bits.

Figure 7:
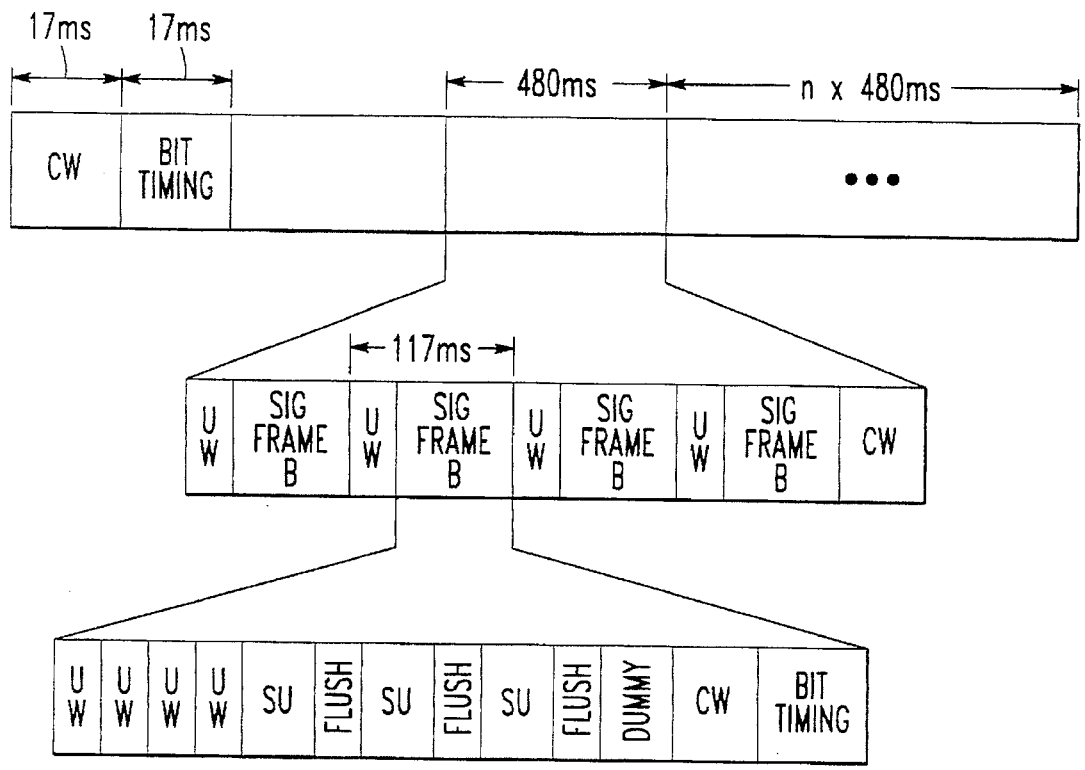
FIG. 7 illustrates an SCPC call setup mode channel format for a 6.4 Kbps speech CODEC and a 6.75 Kbps channel rate.

FIG. 7 illustrates an SCPC call set-up mode channel format for a 6.4 Kbps speech CODEC having a 6.75 Kbps channel rate. Each signalling frame is preceded by a UW'. The signalling frame itself begins with four 24-bit UW's and includes three signalling units of 128 bits each, each followed by eight flush bits. The signalling frame also includes 32 dummy bits followed by a 116-bit CW sequence and 116 bits of bit timing.

The UW patterns for the various frame types described above are given in Table 1. As indicated, the UW pattern for the SCPC voice mode channel format indicative of a frame boundary comprises 1 UW. The UW pattern for the SCPC in-band signalling voice mode channel format indicative of a frame boundary is 1 UW'. The UW pattern for the SCPC 2400 baud data mode indicative of a frame boundary is 1 UW'. The UW pattern for the SCPC 4800 baud data channel format indicative of a frame boundary is 1 UW. The UW pattern for the SCPC 4800 baud data with signalling unit channel format indicative of a frame boundary is 4 UW's. Lastly, the UW pattern for the call set-up channel format indicative of a frame boundary is 5 UW's.

TABLE 1

| Frame Type/Sub-Type | UW Pattern |
| --- | --- |
| SCPC - Voice | 1 UW |
| SCPC - Voice with in-band SU | 1 UW' |
| SCPC - 2400 Baud Data | 1 UW' |
| SCPC - 4800 Baud Data | 1 UW |
| SCPC - 4800 Baud Data With SU | 4 UW' |
| SCPC - Call Set Up | 5 UW' |

In order to avoid ambiguities, for instance between voice and 4800 baud data channel formats, the upper layer protocol of the MSAT system limits the frame types the transmitter can send and the receiver can identify. For transitions between voice and 2400 baud data or 4800 baud data modes, the MSAT system requires an intermediate step using call set-up frames. For example, if the last frame transmitted is voice, the transmitter cannot send, and hence the receiver cannot identify, the next frame as 2400 baud data. This avoids confusion between 2400 baud data and voice with in-band signalling unit channel formats. However, the presence of UWs and UW's internal to the frames complicates the frame type identification role of the superframe lock subsystem.

The superframe lock subsystem must identify the type of frame within the bit stream that arrives at the mobile terminal receiver at the beginning of a call. Depending on the party that initiates the call, the first frame type can be either voice (or data) or call set-up. If the call originates or is initiated by the mobile terminal, the first frames to subsequently reach the mobile terminal receiver from the feeder link earth station (FES) are voice or data frames. However, when a public switched telephone network (PSTN) or another mobile terminal is the originator or initiator of the call, the first frames to reach the mobile terminal receiver from the feeder link earth station are call set-up frames. Accordingly, the initiator of the call determines the frame type that begins the call. As noted above, since call set-up frames as illustrated in FIG. 7 include internal UWs, the probability of false frame acquisition is greater for call set-up frames than for voice frames.

In addition to the presence of internal UWs within call set-up frames, a lack of periodicity exists within the bit stream frame structure within a superframe. The basic period of the transmitted bit streams, as variously illustrated in FIGS. 2–7, is the 480 msec duration of a superframe. Each superframe contains 4 contiguous frames of approximately 117 msec duration followed by a CW sequence of 11 msec duration. Accordingly, periodicity between the frame boundaries within contiguous superframes is not realized.

Figure 8:
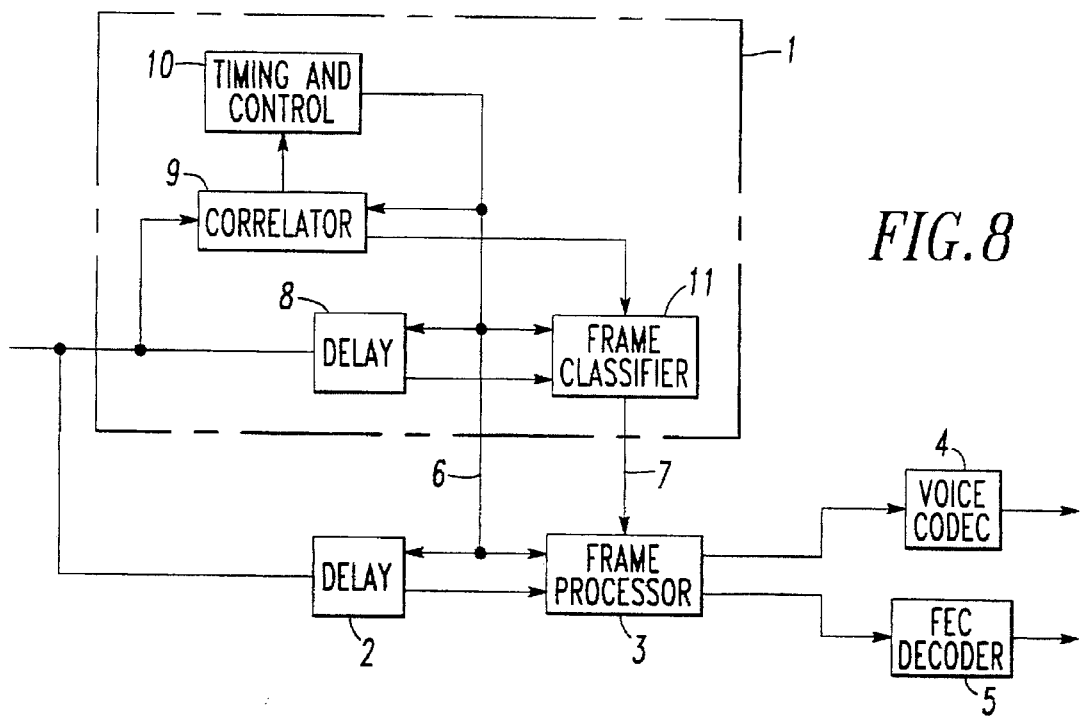
FIG. 8 illustrates a superframe lock subsystem of an embodiment of the present invention for use with a mobile satellite-mobile terminal receiver.

FIG. 8 illustrates the details of the superframe lock subsystem 1 of the present invention in relation to the various components of the mobile terminal communications receiver illustrated in FIG. 1. The demodulated bit stream is input to delay element 8 and correlator 9. Correlator 9 is the computational "workhorse" of the superframe lock subsystem. Correlator 9 detects the presence of the various bit patterns such as the UW, the UW' and the CW sequence within the demodulated bit stream. Correlator 9 cross-correlates the demodulated bit stream with the various possible bit patterns, computes the energy in each correlation input segment and compares the cross-correlation value to a threshold based upon energy. Upon detection of a particular UW or a CW sequence, correlator 9 outputs a flag indicative of the type and timing of the UW or CW sequence detected in the bit stream. Correlator 9 may be software implemented or may be a sliding window correlator or the like.

Timing and control section 10 of FIG. 8 controls the inputs and tests conducted by correlator 9. The bit pattern detections produced by correlator 9 are output to timing and control section 10 and frame classifier 11. Timing and control section 10, based on the bit pattern detections output by correlator 9, determines the initial frame and superframe boundaries and predicts the arrival times of subsequent boundaries. When the arrival of a frame boundary as indicated by a UW or when the end of a superframe as indicated by a CW sequence is imminent, timing and control section 10 selects the particular correlator bit pattern and subsequently activates and instructs correlator 9 to search for and detect the presence of the particular correlator bit pattern at the particular timing. Timing and control section 10 also generates addressing for an input buffer of frame processor 3 to ensure that the particular bits of the bit stream sent to the input buffer of frame processor 3 are internal to a particular frame of the bit stream and exclude bits corresponding to boundary UWs. Timing and control section 10 delivers timing information and control instructions to delay unit 8, correlator 9, frame classifier 11, delay unit 2 and frame processor 3 through line 6. Timing and control section 10 may be software implemented or microprocessor based.

Frame classifier 11 is coupled to delay unit 8 to receive the delayed bit stream and is coupled to correlator 9 to receive the bit pattern detections. Frame classifier 11 determines frame type by processing counts of the various bit pattern detections provided by correlator 9. The result of the frame classification by frame classifier 11 is output to frame processor 3 via line 7 to ensure that the functions performed by frame processor 3 are consistent with frame type. Frame classifier 11 can also be software implemented or microprocessor based.

Figure 9:
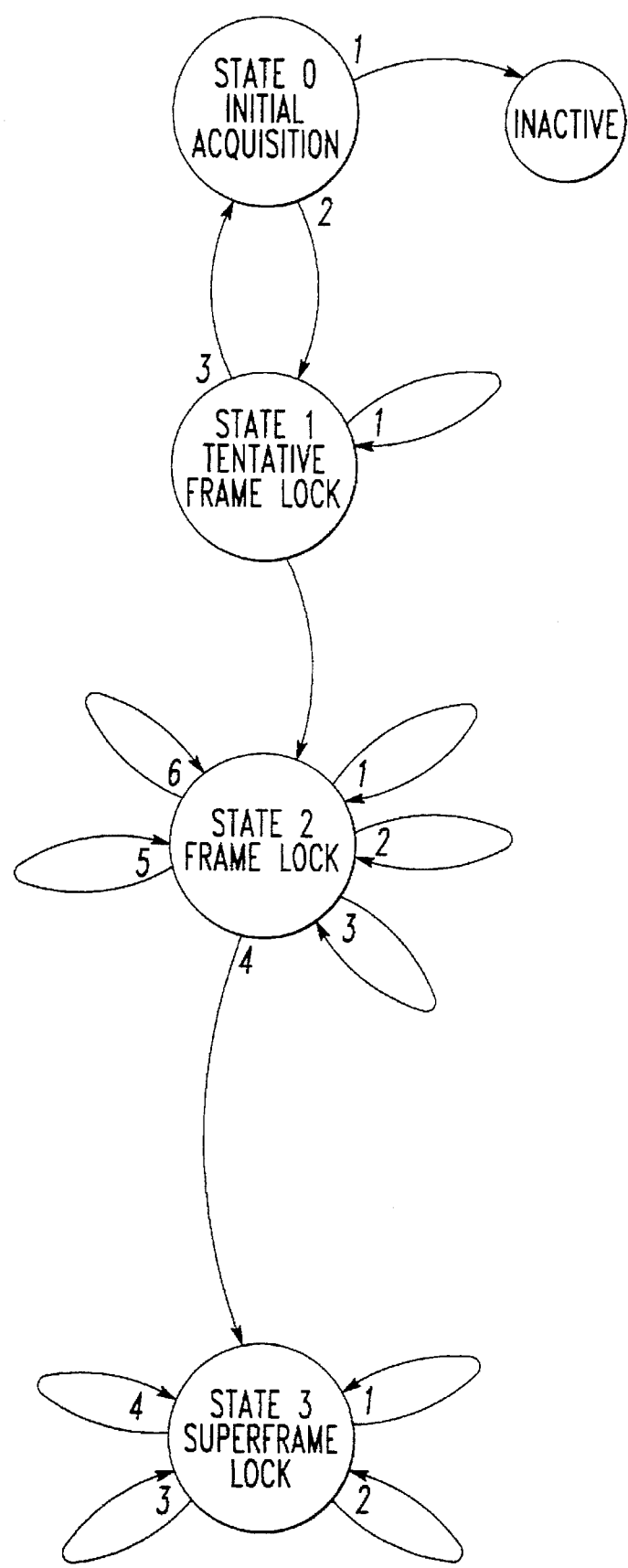
FIG. 9 illustrates a state transition diagram of the superframe lock subsystem of the present invention.

FIG. 9 illustrates a superframe lock state transition diagram which provides the basis of the general functioning of superframe lock subsystem 1 as embodied in the present invention. In the SCPC mode, the mobile terminal receiver will be in one of four possible states: 0) initial acquisition, 1) tentative frame lock, 2) frame lock and 3) superframe lock. The goal of the superframe lock subsystem of the present invention is to reliably transition from the initial acquisition state to the final superframe lock state in a timely manner. The four states will be described as follows.

During the initial acquisition state, the superframe lock subsystem searches for UWs. Upon detecting the presence of a first UW, the superframe lock subsystem declares that the first UW corresponds to a tentative frame boundary, classifies frame type based on the presence of additional UWs at the frame boundary, processes the information frame normally in accordance with classified frame type, predicts the location of subsequent UWs indicative of frame boundaries and enters the tentative frame lock state. The superframe lock subsystem searches for the second UW at the predicted location during the tentative frame lock state. The superframe lock subsystem allows for the presence of multiple internal UWs within a frame and the possibility that the first detected UW was interior to a frame. Upon detection of two UWs separated by a frame duration, and confirmation that the UWs are boundary UWs rather than UWs interior to a frame, the superframe lock subsystem classifies and processes the information frame and enters the frame lock state. In the frame lock state, the superframe lock subsystem searches for a superframe boundary, which is marked by the presence of a CW sequence. Upon detection and correct identification of the CW sequence that marks the end of a superframe, and upon confirmation of the boundaries of the frames within each superframe, the superframe lock subsystem classifies and processes the information frame and enters the superframe lock state. During the superframe lock state, detection of UWs marking the individual frames in the corresponding superframes are sufficient to maintain superframe timing. Frame processor 3 continues to extract and process the information content of each frame subsequent classification by frame classifier 11 as in the previous states. Each of the states described generally above and illustrated in FIG. 9 are described in detail hereinafter.

During the initial acquisition state, timing and control section 10 of FIG. 8 instructs correlator 9 to search for a UW. The search proceeds continuously as correlator 9 repeats the correlation procedures for every demodulation symbol. A symbol in the bit stream comprises two bits. The search for a UW terminates when one of the two following events occur. Event 1 of the initial acquisition state corresponds to the failure of correlator 9 to detect a UW within a predetermined time period. In this case, an upper layer protocol of the mobile terminal receiver directs the receiver to abandon acquisition and return to an outbound signalling channel. Upon occurrence of this event, the superframe lock system is maintained inactive. Event 2 of the initial acquisition state corresponds to detection of a UW or UW' by correlator 9. When this happens, timing and control section 10 directs frame classifier 11 to classify frame type based upon detection by correlator 9 of additional UWs at the frame boundary and subsequently directs frame processor 3 to process the information frame based upon the classification by frame classifier 11. Thereafter, timing and control section 10 predicts subsequent frame boundaries based upon the bit pattern detections provided by the correlator 9 and the superframe lock subsystem subsequently transitions to the tentative frame lock state.

As noted above, upon detection of a UW in the initial acquisition state, the superframe lock subsystem transitions to the tentative frame lock state as illustrated in FIG. 9. In the tentative frame lock state, timing and control section 10 instructs correlator 9 to search for and detect a UW exactly 24 bits prior to the predicted next frame boundary. The predicted next frame boundary is the frame boundary subsequent the frame boundary which corresponds to the first UW detected during the initial acquisition state. This procedure is necessary to determine if the first UW detected during the initial acquisition state corresponds to a frame boundary or is a UW internal to a frame, such as an internal UW' of the SCPC call set-up mode channel format illustrated in FIG. 7. If a UW is detected 24 bits prior to the predicted next frame boundary (an early UW), the timing and control section 10 considers the first UW detected during the initial acquisition state as an internal UW and subsequently recalculates predicted frame boundaries based on the early UW detected during the tentative frame lock state. The superframe lock subsystem thereafter remains in the tentative frame lock state in order to check the validity of the revised predicted frame boundaries. This procedure corresponds to event 1 of the tentative frame lock state. In this way, the superframe lock subsystem can detect the unlikely condition that correlator 9 has missed two UWs during the initial acquisition state.

In the event that an early UW is not detected 24 bits prior to the predicted next frame boundary in the tentative frame lock state, correlator 9 searches for and detects if a UW exists at the predicted next frame boundary under control of timing and control section 10. If the UW appears as predicted, the superframe lock subsystem classifies frame type, processes the information frame and subsequently transitions to the frame lock state. The transition from the tentative frame lock state to the frame lock state corresponds to event 2 of the tentative frame lock state of FIG. 9.

If the search for the early UW exactly 24 bits prior to the predicted next frame boundary and the subsequent search for a UW at the predicted next frame boundary both fail, or in other words if UWs are not found, the superframe lock subsystem transitions from the tentative frame lock state back to the initial acquisition state. This corresponds to event 3 of the tentative frame lock state. Although fades and blockages may result in failure of correlator 9 to detect UWs and return to the initial acquisition state, both tests will also fail if the first UW detected in the initial acquisition state marks the last frame of a superframe. As illustrated in the SCPC voice mode channel format of FIG. 2 for example, when this happens, the next predicted frame boundary falls at the beginning of the CW sequence that ends a superframe, thus causing failure of the UW tests.

In order to ultimately transition to the final superframe lock state illustrated in the state diagram of FIG. 9, correlator 9 must detect the CW sequence at the end of a superframe. Accordingly, upon transition from the tentative frame lock state to the frame lock state, correlator 9 searches not only for a UW, but also for a CW sequence at the beginning of each predicted frame boundary. Upon detection of a CW sequence by correlator 9, timing and control section 10 advances the correlation processing to the end of the CW to search for and detect the UW which marks the beginning of the next superframe. Transition to the superframe lock state therefore requires detection of both the CW sequence that ends the current superframe and the UW that begins the next superframe.

Since the superframe lock subsystem may remain in the frame lock state for an extended period of time, correlator 9 extends the search for UWs from one symbol (2 bits) prior to a predicted frame boundary to one symbol past the predicted frame boundary. If correlator 9 detects a slightly early or slightly late UW, timing and control component 9 adjusts the frame boundary estimate accordingly. This allows for symbol slippage due to inaccuracies in symbol timing.

During the frame lock state, the superframe lock subsystem classifies frame type as in the previous states. For example, correlator 9 conducts UW tests beginning at 24 bits, 48 bits, 72 bits and 96 bits after the beginning of each frame boundary and passes the results of the tests to frame classifier 11. In the SCPC call set up mode channel format illustrated in FIG. 7, a UW' exists at each of the bit locations 24 bits, 48 bits, 72 bits and 96 bits subsequent the beginning of a frame boundary. On the other hand, voice frames of the SCPC voice mode channel format illustrated in FIG. 2 for example contain random data at the above-noted bit positions. Since fades or random noise can cause erroneous correlator results, frame classifier 11 may implement software and use programmable count thresholds for the classification tests. Frame classification results are subsequently output along line 7 to frame processor 3 as soon as the results are available so that frame processing functions may be activated. This process of frame classification occurs during the initial acquisition and tentative frame lock states as noted.

The various events of the frame lock state are described as follows. As noted above, correlator 9 searches for a CW sequence at each frame boundary, and if found, determines if a UW exists immediately thereafter. Upon detection of a UW at a predicted frame boundary during the tentative frame lock state and subsequent transition to the frame lock state, correlator 9 searches for and detects if a CW sequence exists at the predicted next frame boundary. Since the Hamming distance between a CW sequence and a UW is one half of the 24 bit sequence length, it is extremely unlikely that a CW sequence could be mistaken as a UW by correlator 9. Upon detection of a UW at the predicted next frame boundary, rather than a CW sequence, the superframe lock subsystem processes the information frame normally and remains in the frame lock state. This corresponds to event 1 of the frame lock state.

As noted above, correlator 9 searches for and detects the presence of a UW from one symbol prior to a predicted frame boundary to one symbol past the predicted frame boundary. Timing and control section 10 subsequently adjusts the frame prediction to reflect an early or late detected UW. This corresponds to event 2 of the frame lock state.

Upon detection of a UW at a predicted frame boundary, correlator 9 determines if the UW pattern within the frame matches UW patterns of frame types permitted by an upper layer protocol of the mobile terminal receiver. The UWs for the channel formats described previously are assigned UW patterns as generally disclosed in Table 1. Upon receipt of instructions from frame classifier 11 over line 7 that the detected frame boundary UW does not match any of the permitted UW patterns, frame processor 3 proceeds to process the frame data as if the pattern of the corresponding UW matched the permitted UW pattern of the most recent frame. In other words, frame processor 3 proceeds as though the frame type of the current frame matches the frame type of the last processed allowable frame. In this instance, frame processor 3 operates in a coarse mode. This corresponds to event 3 of the frame lock state.

As described previously, upon detection by the correlator 9 of a CW sequence having a UW immediately thereafter, the superframe lock subsystem processes the information frame normally and subsequently transitions to the superframe lock state. This corresponds to event 4 of the frame lock state.

Timing and control section 10 also maintains a count of the number of frames detected during the frame lock state. When the count reaches 4, timing and control section 10 resets a frame count to zero and advances the predicted frame boundary marker 72 bits to account for a CW sequence which must have been present in the bit stream and which inadvertently was not detected. For example, with reference to the SCPC voice mode channel format illustrated in FIG. 2, a CW sequence must be presented at some point along a bit stream sequence in which four UWs have been detected in the frame lock state subsequent to detection of a UW in the initial acquisition state and a UW in the tentative frame lock state. By advancing the predicted frame boundary marker by 72 bits (the bit duration of the CW sequence), the predicted frame boundary can be realigned with the actual frame boundary. This corresponds to event 5 of the frame lock state illustrated in FIG. 9.

Correlator 9 may also repeatedly fail to detect UWs in the frame lock state. However, since the probability of incorrectly transitioning from the initial acquisition state to the frame lock state is so small, the superframe lock subsystem does not transition to a lower state, i.e. either the initial acquisition state or the tentative frame lock state. On the basis of the predicted frame boundaries, the superframe lock subsystem continues to initiate data transfers to frame processor 3 in order to minimize the loss of useful information. Frame processor 3 or an upper level protocol of the mobile terminal receiver can subsequently discard invalid data on the basis of CRC checks. Timing and control section 10 does however inform the upper layer of missed UW detections. An upper layer protocol of the mobile terminal receiver will eventually initiate call shut down if the missed UW count exceeds a threshold maintained at a predetermined level. The repeated failure to detect UWs as described corresponds to event 6 of the frame lock state.

As noted above, upon detection by correlator 9 in the frame lock state of a CW sequence and a UW immediately after the CW sequence, the superframe lock subsystem transitions to the superframe lock state. In the superframe lock state, timing and control section 10 terminates the search for the CW sequence at the end of each superframe. Detection of the UWS marking the individual frames in the superframe are sufficient in the superframe lock state to maintain superframe timing. The processing functions of the superframe lock state are similar to those of the frame lock state. During the superframe lock state, correlator 9 continues to allow for symbol slippage by checking for the presence of frame boundary UWs within one symbol on either side of the predicted frame boundaries. Since searching and detecting of a CW sequence at the end of each superframe is terminated in the superframe lock state, timing and control section 10 advances the frame boundary prediction by 72 bits (bit duration of a CW sequence) at the end of the fourth frame of every superframe. Moreover, frame classifier 11 declares voice or call set-up frames depending upon the number of UWs detected by correlator 9 in the first four blocks after the frame boundary UW. The most recent valid frame type identification determines the functions performed by frame processor 3, i.e. failure to determine a valid frame type has no effect on frame processor 3 in this instance. In the event of an undetected boundary UW, timing and control section 10 initiates the transfer of the 768 bits internal to the corresponding frame to frame processor 3 on the basis of the best estimate of frame boundaries by correlator 9. The superframe lock subsystem will however notify an upper layer protocol of the mobile terminal receiver of the missed UWs.

Figure 10A:
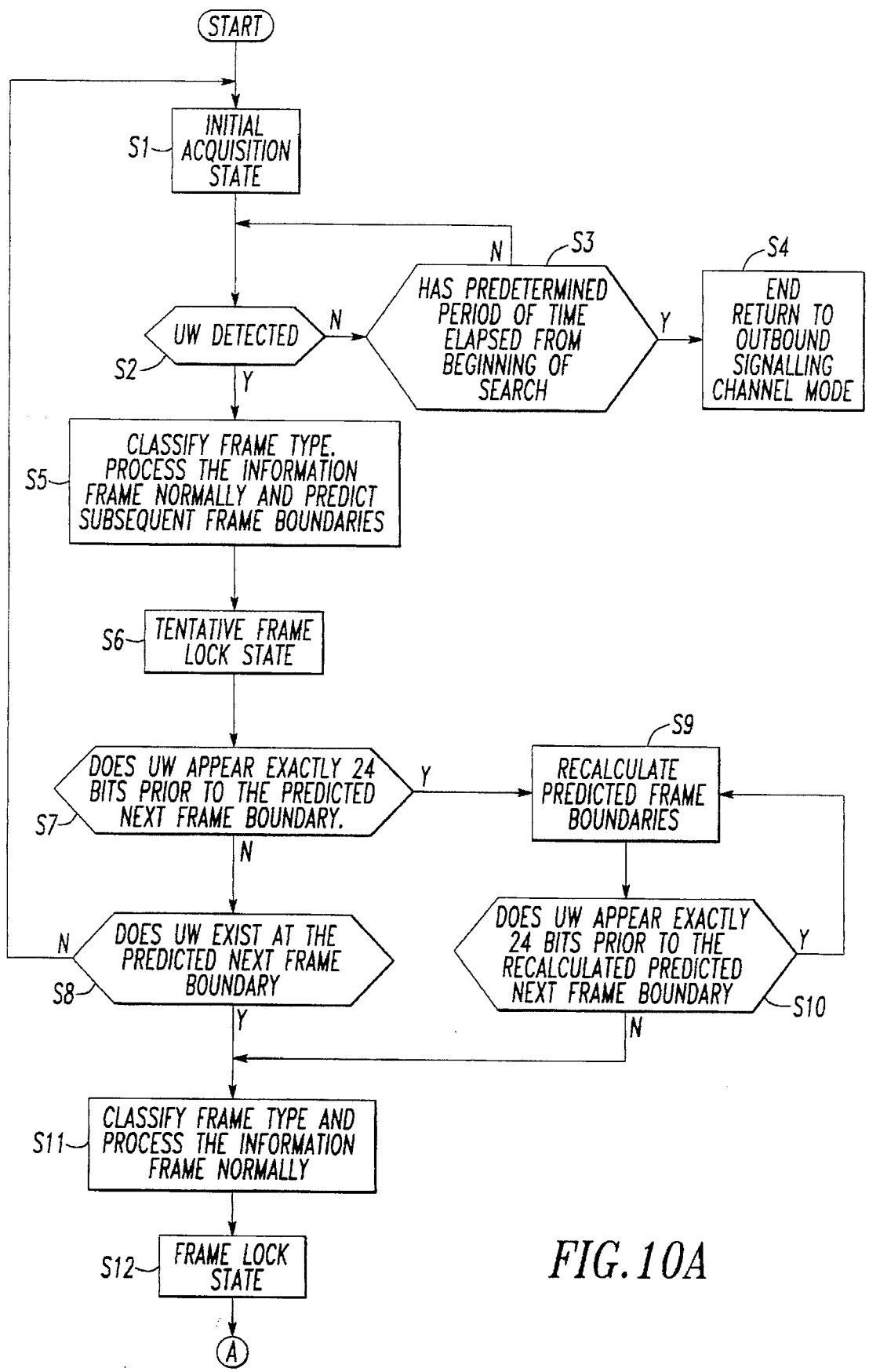
Figure 10C:
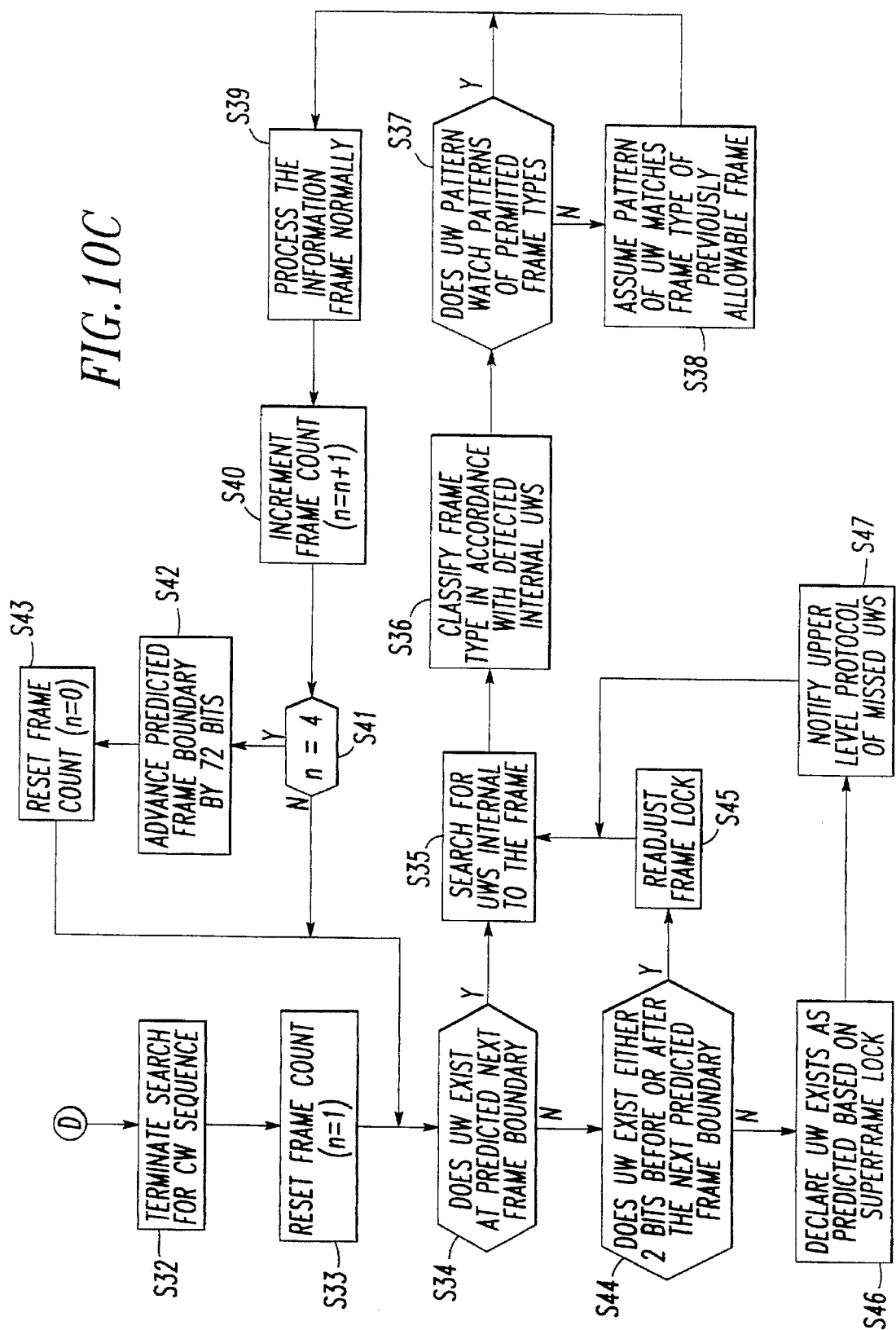

FIGS. 10A–10C illustrate a flow chart useful for explaining functioning steps of the superframe lock subsystem described above in connection with the state transition diagram of FIG. 9. The superframe lock subsystem begins processing by entering the initial acquisition state of step S1. Processing proceeds to step S2 wherein correlator 9 searches for a UW. If a UW is not found, processing proceeds to step S3 wherein it is determined whether a predetermined period of time from the beginning of the search for a UW has elapsed. If the determination in step S3 is affirmative, processing proceeds to step S4 and terminates, wherein the mobile terminal receiver returns to an outbound signalling channel mode. Upon determination in step S3 that the predetermined period of time from the beginning of the search for a UW has not elapsed, processing returns to step S2. Upon detection of a UW in step S2, processing proceeds to step S5 wherein timing and control section 10 directs frame classifier 11 to classify frame type as described previously, directs frame processor 3 to process the information frame based on classified frame type and predicts subsequent frame boundaries using the UW detected in step S2 as a boundary marker. Processing proceeds further to step S6 wherein the tentative frame lock state is entered.

Upon entry of the tentative frame lock state, timing and control section 10 instructs correlator 9 to search for a UW exactly 24 bits prior to the predicted next frame boundary in step S7. This test is performed to ensure that the first UW detected in step S2 does not correspond to a UW internal to a frame, such as an internal UW' of an SCPC call set up mode channel format as illustrated in FIG. 7 for example. Clearly, prediction of the subsequent frame boundaries will be incorrect if the prediction in step S5 is based upon a detected UW which is internal to a frame. Upon determination in step S7 that a UW does not appear exactly 24 bits prior to the predicted next frame boundary, it may be preliminarily concluded that the first UW detected during the initial acquisition state is not an internal UW. Subsequent to a negative determination in step S7, processing proceeds to step S8 wherein timing and control section 10 directs correlator 9 to determine if a UW exists at the predicted next frame boundary. In the event that it is determined in step S8 that a UW does exist at the predicted next frame boundary, the superframe lock subsystem concludes that the first and second detected UWs are separated by a frame duration and that the frame boundary prediction of step S5 is accurate. Processing then proceeds to step S11 wherein frame classifier 11 classifies frame type and frame processor 3 processes the information frame normally. Thereafter, in step S12, processing transitions into the frame lock state. However, in the event that it is determined in step S8 that a UW does not exist at the predicted next frame boundary processing returns to step S1 and transitions to the initial acquisition state. As described previously, a negative determination during step S8 may be indicative of detection of a UW in the initial acquisition state which happens to mark the last frame of a superframe.

Returning to step S7, if it is determined that a UW appears exactly 24 bits prior to the predicted next frame boundary, processing proceeds to step S9 wherein timing and control section 10 recalculates predicted frame boundaries based upon the detected early UW. The purpose for the early UW test is to ensure that the UW detected during the initial acquisition state does not correspond to a UW internal to a frame. Upon recalculation of the predicted frame boundary in step S9, timing and control section 10 again directs correlator 9 to search for an early UW exactly 24 bits prior to the recalculated predicted next frame boundary in step S10. If it is determined in step S10 that an early UW exists, processing returns to step S9 and the predicted frame boundaries are again recalculated. If it is initially determined in step S10 that a UW does not appear exactly 24 bits prior to the recalculated predicted next frame boundary, timing and control section 10 concludes that the predicted frame boundaries recalculated at step S9 are correct and processing proceeds to step S11.

Upon entry to the frame lock state, processing proceeds to step S13 illustrated in FIG. 10B and a frame count is reset to (n=0). The purpose of the frame count will be explained hereinafter in connection with the subsequent steps. Processing proceeds to step S14 wherein timing and control section 10 directs correlator 9 to search for a CW sequence indicative of the end of a superframe. Correlator 9 therefore searches for a CW sequence at the predicted next frame boundary subsequent the frame boundary determined to exist during the tentative frame lock state described above.

In the event that the UW determined to exist during the tentative frame lock state corresponds to a UW indicative of the frame boundary of the last voice frame and in the event that correlator 9 detects the CW sequence existing at the predicted next frame boundary of the illustrated superframe, processing proceeds to step S15. Timing and control section 10 subsequently directs correlator 9 to search for and detect the presence of a UW immediately after the detected CW sequence. As illustrated in FIG. 2, a UW exists at the initial frame boundary of the superframe subsequent the detailed superframe. Upon detection of the corresponding UW in step S15, timing and control section 10 concludes that a superframe boundary has been identified and directs frame classifier 11 to classify frame type and frame processor 3 to process the information of the corresponding frame in step S16. In step S17, the superframe lock subsystem subsequently enters the superframe lock state.

Returning to step S14, in the event that correlator 9 does not detect a CW sequence at the predicted next frame boundary subsequent the frame boundary determined to exist during the tentative frame lock state, processing proceeds to step S17. Since a CW sequence does not exist at the predicted next frame boundary, timing and control section 10 directs correlator 9 to determine if instead a UW exists at the predicted next frame boundary. If it is determined in step S18 that a UW exists at the predicted next frame boundary, processing proceeds to step S19 wherein frame classifier 11 determines frame type for classification by processing counts of the various bit patterns provided by correlator 9. Frame classifier 11 determines if the pattern of the detected UW matches UW patterns of frame types permitted by an upper layer protocol of the mobile terminal receiver. In the event that the determination in step S19 is affirmative, processing proceeds to step S21 wherein timing and control section 10 directs frame processor 3 to process the frame information of the corresponding frame normally. However, if it is determined in step S19 that the pattern of the UW determined to exist in step S18 does not match a permitted UW pattern, processing proceeds to step S20 wherein frame classifier 11 assumes that the pattern of the UW detected in step S18 matches the frame type of the previously processed allowable frame. Subsequently, frame processor 3 processes the information frame normally in step S21 in accordance with the assumed frame type in a coarse mode of operation.

Subsequent to processing of the information frame in step S21, the frame count is incremented in step S22 (n=n+1) and processing proceeds to step S23 wherein it is determined if n=4. The purpose of this step is to determine whether or not four frames have been processed during the frame lock state and whether or not the existence of a CW sequence should have been detected. In the event that it is determined in step S23 that frame count n does not equal 4, processing returns to step S14 and proceeds accordingly. However, in the event it is determined in step S23 that the frame count n equals 4, processing proceeds to step S24 wherein the frame count is reset. Thereafter, timing and control section 10 directs correlator 9 to determine if a CW sequence exists at the corresponding predicted next frame boundary at step S25. In the event it is determined that a CW sequence does exist at the corresponding predicted next frame boundary in step S25, processing proceeds to step S15 wherein it is determined if a UW exists immediately at the end of the corresponding CW sequence in order to determine if the CW sequence is indeed indicative of a superframe boundary. However, in the event that it is determined in step S25 that a CW sequence does not exist at the corresponding predicted next frame boundary, processing proceeds to step S26 and correlator 9 advances 72 bits to a new predicted frame boundary in order to account for a missed CW sequence. Since the frame count was determined in step S23 to be equal to 4, regardless of where within the superframe an initial UW was detected, a CW sequence must have been present. As described previously, advancement by the 72 bit duration of an undetected CW sequence realigns the predicted frame boundaries. Upon advancement to the new predicted frame boundary in step S26, processing proceeds to step S27 wherein correlator 9 determines whether a CW sequence exists at the new predicted frame boundary. In the event that it is determined in step S27 that a CW sequence exists at the new predicted frame boundary, processing returns to step S15 wherein the correlator determines whether a UW exists immediately at the end of the detected CW sequence in order to determine if the CW sequence does indeed correspond to a superframe boundary. In the event that it is determined in step S27 that a CW sequence does not exist at the new predicted frame boundary, processing returns to step S18 and proceeds accordingly wherein the new predicted frame boundary is considered as the predicted next frame boundary.

Returning to step S18, in the event that it is determined that a UW does not exist at the predicted next frame boundary, correlator 9 determines in step S28 if a UW exists either two bits before or after the predicted next frame boundary. If it is determined in step S28 that the unique word does exist either two bits before or after the predicted next frame boundary, frame lock is readjusted in step S29 and processing proceeds to step S19. However, in the event that it is determined in step S28 that a UW does not exist either two bits before or after the predicted next frame boundary, processing proceeds to step S30 wherein the upper level protocol of the mobile terminal receiver is informed of the missed UW detection. Processing subsequently proceeds to step S21. As noted above, the superframe lock subsystem may remain in the frame lock state for an extended period of time and the purpose of searching for a UW either two bits before or after a predicted frame boundary is to allow for symbol slippage due to inaccuracies in symbol timing.

Returning to step S15, in the event that it is determined that a UW does not exist at the end of the detected CW sequence, processing proceeds to step S31 wherein timing and control section 10 directs frame classifier 11 to classify frame type and frame processor 3 to process the information of the corresponding frame normally. Subsequently, processing returns to step S13 as the superframe lock subsystem remains in the frame lock state since the superframe boundary has not definitely been detected.

Upon entry of the superframe lock subsystem into the superframe lock state at step S17, processing proceeds to step S32 of FIG. 10C wherein timing and control section 10 directs correlator 9 to terminate the search for a CW sequence at the end of each superframe. Detection of the UWs marking the individual frames in the superframe are sufficient to maintain superframe timing during the superframe lock state. Processing proceeds from step S32 to step S33, wherein the frame count is reset to n=1 since upon verification of the superframe boundary during the frame lock state, the existence of a first UW of the subsequent superframe immediately at the end of a corresponding CW sequence has been determined. The UW determined to exist in step S15 of FIG. 10B corresponds to the first UW of the illustrated superframe of FIG. 2, for example. The frame count is therefore reset to n=1 in step S33 since the first UW of the superframe has already been detected.

Processing proceeds to step S34 wherein timing and control section 10 directs correlator 9 to determine if a UW exists at the predicted next frame boundary subsequent the frame boundary corresponding to the UW detected in step S15. If it is determined in step S34 that a UW does exist at the predicted next frame boundary, processing proceeds to step S35 wherein correlator 9 searches for UWs internal to the frame. As illustrated in FIG. 7 in the call set-up mode channel format, four internal UW's exist immediately after a boundary UW'. Moreover, in the in-band signalling data mode channel format illustrated in FIG. 6, three internal UW's exist immediately after the boundary UW'. Upon detection of internal UWs in step S35, processing proceeds to step S36 wherein frame classifier 11 determines frame type based on the number of detected internal UWs. Subsequently in step S37, frame classifier 11 determines if the UW pattern and number detected match one of the patterns of permitted frame types. Upon determination in step S37 that the UW pattern does not match one of the permitted frame types, processing proceeds to step S38 wherein frame classifier 11 assumes that the pattern of the detected UW matches a pattern of the previously processed allowable frame. Processing subsequently proceeds to step S39 wherein the information of the corresponding frame is processed normally by frame processor 3. In the event that it is determined in step S37 that the UW pattern and number detected match one of the permitted UW patterns, processing proceeds directly to step S39 wherein the information of the corresponding frame is processed normally by frame processor 3. Processing of the information frame in step S39 subsequent step S38 corresponds to coarse mode processing as described previously.

Processing proceeds from step S39 to step S40 wherein the frame count is incremented to n=n+1 and wherein it is subsequently determined in step S41 if the frame count equals 4. If it is determined in step S41 that the frame count does not equal 4, processing returns to step S34 wherein processing of the particular superframe continues. In the event that it is determined in step S41 that the frame count equals 4, or that the particularly detected UW corresponds to the frame boundary of the fourth and final frame of the corresponding superframe, the predicted frame boundary is advanced by 72 bits in step S42 to account for the CW sequence. Processing proceeds to step S43 wherein the frame count is reset to n=0. Processing then subsequently returns to step S34 wherein it is determined if a UW exists at the predicted next frame boundary (advanced by 72 bits in step S42). Processing subsequently proceeds accordingly.

Returning to step S34, if it is determined that the UW does not exist at the predicted next frame boundary, processing proceeds to step S44 wherein it is determined whether or not a UW exists either two bits before or after the predicted next frame boundary. If the determination in step S44 is affirmative, processing proceeds to step S45 wherein frame lock is readjusted to allow for symbol slippage due to inaccuracies in symbol timing. Thereafter, processing proceeds to step S35 wherein correlator 9 searches for UWs internal to the frame, based upon frame lock readjustment. In the event that the determination in step S44 is negative, timing and control section 10 declares in step S46 that the corresponding UW exists as predicted previously based upon the superframe lock state. Processing then proceeds to step S47 wherein the upper level protocol is notified of the missed UW. Subsequently, processing proceeds to step S35 wherein correlator 9 searches for UWs internal to the frame in accordance with the UW as declared to exist in step S46.

It is to be understood that the classification and processing of the information frames in step S5, S11, S16 and S31 include the processing of steps S35-S38 of FIG. 10C. That is, UWs internal to a frame are searched for and considered during classification and also processing of the information frames in a coarse mode occurs if necessary. It is to be further understood that step S19 of FIG. 10B includes processing related to searching for UWs internal to the frame and subsequent classification, as in steps S35 and S36 of FIG. 10C.

Superframe lock subsystem performance and the effects of fades and blockages of the signal transmitted to the a mobile terminal receiver incorporating the superframe lock subsystem will now be considered. The measure of performance of the superframe lock subsystem which is of the most interest is acquisition time, i.e. the time between the end of the preamble of the bit stream and the guaranteed transfer of valid data frames to the frame processor 3. The time required for the subsystem to reach the frame lock state is an important secondary measure of performance since timing within a particular superframe must be determined to transition from the tentative frame lock state to the frame lock state. However, processing of valid data frames is not guaranteed until the subsystem reaches the superframe lock state.

Under ideal conditions, all subsystem tests will succeed at the first opportunity. For example, under ideal conditions, correlator 9 will detect the first UW after the preamble in the initial acquisition state, the very next UW in the second frame during the tentative frame lock state and the next CW sequence and initial UW of the second superframe during the frame lock state. When this happens, the superframe lock subsystem will reach the frame lock state in two frame times, or 234 msecs, and will achieve superframe lock in the minimum time of approximately 484 msecs. This time comprises four frame times of 117 msecs each, the 10.7 msec duration of the CW sequence and the duration of the first UW in the second superframe. In the event that correlator 9 fails to detect the first UW of a superframe, the details of what occurs thereafter depends upon frame type.

Nevertheless, the superframe lock subsystem achieves superframe lock in the minimum time provided it makes no other mistakes. In the case of voice frames, correlator 9 will continue to search for and detect the UWs of the next two frames, thus reaching state 2 after 351 milliseconds. Successful detection of the CW sequence after the fourth frame and detection of the UW immediately subsequent the CW sequence will lead to superframe lock in minimum time. In the case of call set-up frames, the superframe lock subsystem will likely detect the second UW (i.e. the UW') in the first frame causing a transition to the tentative frame lock state with a frame time that is 1 UW duration too late. The subsequent test for an early UW 24 bits before the predicted next frame boundary in the tentative frame lock state will subsequently align the superframe lock subsystem to the correct frame time. The subsystem will remain in the tentative frame lock state for the duration of the second frame and then transition to the frame lock state upon detecting the third UW of the superframe. Thus, the superframe lock subsystem will again reach the superframe lock state in minimum time.

It is emphasized that the above described error conditions are not the only error conditions that the superframe lock subsystem can tolerate and still reach superframe lock in minimum time. Table 2 summarizes various error conditions which lead to minimum superframe lock times. The states are represented in the sequences of the table as follows: initial acquisition state—0, tentative frame lock state—1, frame lock state—2 and superframe lock state—3. The corresponding test results are indicated as T for true or pass, F for false or fail and X for immaterial. Thus, the first sequence of Table 2 denotes the following sequence of events:

0: Subsystem in state 0,

T: Test for UW of the first frame is successful,

1: Subsystem in state 1,

T: Test for UW of the second frame is successful,

2: Subsystem in state 2,

X: Test for UW of the third frame is immaterial,

2: Subsystem in state 2,

X: Test for UW of the fourth frame is immaterial,

T: Test for CW is successful,

T: Test for first UW of second superframe is successful, and

3: Subsystem in state 3.

TABLE 2

| State/Test Result Sequence | Comments |
|---|---|
| 0 T 1 T 2 X 2 X 2 TT 3 | All tests succeed |
| 0 F 0 T 1 T 2 X 2 TT 3 | First UW test fails |
| 0 F 0 F 0 T 1 T 2 TT 3 | First two UW tests fail |
| 0 T 1 F 0 T 1 T 2 TT 3 | Second UW test fails |
| 0 F 0 T 1 T 2 X 2 TT 3 | Second UW' in 1-st Frame Detected |
| 0 F 0 F 0 T 1 T 2 TT 3 | Third UW' in 1-st Frame Detected |

It is emphasized that the pattern 2 TT 3 must end each sequence in the table to indicate that the superframe lock subsystem transitions from state 2 (frame lock state) to state 3 (superframe lock state) at the beginning of the second superframe.

The second to the last sequence in Table 2 represents the situation described above wherein correlator 9 misses the first UW' of an initial call set up frame and subsequently detects the second UW' of that frame. The last sequence of Table 2 represents a sequence wherein correlator 9 fails to detect both the first and second UW' of a call set up frame and detects the third UW' of the call set up frame. The superframe lock subsystem again acquires superframe lock in minimum time.

It should be emphasized that a necessary condition for superframe lock in minimum time is that the superframe lock subsystem be in state 2 (frame lock state) during the final frame of the first superframe. If the superframe lock subsystem is in the frame lock state and fails to detect the corresponding CW sequence, the superframe lock subsystem remains in the frame lock state for another full superframe. As described previously with respect to step S26 of FIG. 10B, the new predicted frame boundary is advanced 72 bits to account for the duration of the CW sequence that must have occurred during the superframe. Before the superframe lock subsystem makes the corresponding adjustment, it is noted that some of the data of the frames sent to frame processor 3 may be improperly framed. Regardless, the superframe lock subsystem will be correctly aligned after four frame times and will detect the CW sequence at the end of the second superframe in view of the 72 bit advancement.

It is further noted that if the superframe lock subsystem detects a CW sequence in the frame lock state and misses the first UW of the next superframe which occurs immediately thereafter, the data of the subsequent superframe will be correctly framed throughout the corresponding superframe and the superframe lock subsystem will be aligned to detect the CW sequence at the end of the second superframe. Failure to detect the first UW after the CW sequence has been detected has no effect other than postponing the transition to the superframe lock state. It is further noted that if the superframe lock subsystem is in the tentative frame lock state when a CW sequence arrives, the corresponding UW test will fail and the superframe lock subsystem will return to the initial acquisition state from step S8.

The superframe lock subsystem as described above has been designed to minimize superframe lock time by exploiting features of the frame structure. In addition to conducting tests for UWs and other patterns, the superframe lock subsystem predicts the boundaries of the data content of the frames independent of the detectability of the UWs. Under poor channel conditions, the superframe lock subsystem continues to initiate the transfer of data to frame processor 3 and relies on error detection and correction capabilities of frame processor 3 to minimize loss of data.

Among the specific advantages of the superframe lock system of the present invention is the restriction of the UW search to the frame boundary UWs and the subsequent 4 UWs, which conserves processor throughput. Even in the event that the superframe lock subsystem fails to detect a frame boundary UW, the superframe lock system does not operate to process the remaining data portion of the particular frame, although frame processor 3 does indeed process the data of the particular frame. Since each execution of correlator 9 requires approximately 250 processor cycles, approximately 84,000 processing cycles may be saved, which translates into 3 MIP savings in the modem processor.

Another advantage of the superframe lock subsystem of the present invention is that the restriction of the UW searches to locations in the demodulated data where the UWs are anticipated to occur decreases the probability of false UW declaration. Moreover, the conditional probability of losing data due to a UW dropout in the channel is negligible. If the superframe lock subsystem fails to detect the unique bit pattern where predicted, it will continue to initiate transfers to frame processor 3. The superframe lock subsystem makes no Judgment on the data validity.

If a UW drops out due to poor channel conditions, upon conclusion of the fade, the error correction capabilities of frame processor 3 enables recovery of the information. The design of the superframe lock subsystem includes error mitigation features which provide recovery from missed UWs, false frame lock, symbol drift and other detrimental effects. Moreover, the modular organization of the superframe lock subsystem makes for ease of improvement and modification for porting to other satellite communication systems with similar frame structure.

In summary, the superframe lock subsystem of the present invention as described above acquires and maintains lock in minimum time despite the presence of fades and blockages independent of initial frame type and extracts data at an earliest time within the acquisition process. Moreover, the superframe lock subsystem recognizes changes in frame type and overcomes symbol slippage due to timing inaccuracies. Finally, the superframe lock subsystem conserves processor throughput and reduces the probability of incorrect transition to an incorrect state.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of frame synchronization for a superframe lock subsystem comprising:
   a) searching for and detecting a unique word in received data, the received data consisting of superframes including a plurality of frames having frame information therein, a unique word in the received data being indicative of a frame boundary;
   b) predicting the location of frame boundaries in the received data based upon the unique word detected during said step a);
   c) searching for and detecting if a unique word exists in the received data at the predicted frame boundary immediately following the frame boundary corresponding to the unique word detected during said step a);
   d) searching for and detecting if a carrier wave sequence exists in the received data at the predicted frame boundary immediately following the frame boundary corresponding to the unique word detected during said step c), a carrier wave sequence in the received data being indicative of a superframe boundary;
   e) searching for and detecting if a unique word exists in the received data immediately following the carrier wave sequence detected during said step d); and
   f) maintaining frame synchronization of the received data based upon unique words detected subsequent the unique word detected during said step e).

2. The method of frame synchronization for a superframe lock subsystem of claim 1, further comprising terminating said step a) if a unique word is not detected within a predetermined time period.

3. The method of frame synchronization for a superframe lock subsystem of claim 1, wherein said step c) comprises:
   c1) searching for and detecting if a unique word exists in the received data at an early position a predetermined number of bit positions prior to the predicted frame boundary immediately following the frame boundary corresponding to the unique word detected during said step a);

c2) searching for and detecting if a unique word exists in the received data at the predicted frame boundary immediately following the frame boundary corresponding to the unique word detected during said step a), if a unique word is not detected at the early position during step c1);

c3) advancing to said step d) if a unique word is detected during said step c2); and c4) returning to said step a) if a unique word is not detected during said step c2).

4. The method of frame synchronization for a superframe lock subsystem of claim 3, wherein said step c) further comprises:

c5) repredicting the location of frame boundaries based on the frame boundary corresponding to the early position, if a unique word is detected during said step c1) at the early position;

c6) searching for and detecting if a unique word exists in the received data at an early position the predetermined number of bit positions prior to the repredicted frame boundary immediately following the frame boundary corresponding to the early position; and c7) advancing to said step d) if a unique word is not detected during said step c6).

5. The method of frame synchronization for a superframe lock subsystem of claim 4, wherein the received data includes frames having a plurality of unique words located at the corresponding frame boundaries.

6. The method of frame synchronization for a superframe lock subsystem of claim 1, wherein the unique words are indicative of front-end frame boundaries of the frames of the received data.

7. The method of frame synchronization for a superframe lock subsystem of claim 3, wherein the unique words each have n bit length and the predetermined number of bit positions equals n bit positions.

8. The method of frame synchronization for a superframe lock subsystem of claim 1, wherein the carrier wave portions are indicative of rear-end superframe boundaries of the superframes of the received data.

9. The method of frame synchronization for a superframe lock subsystem of claim 1, wherein said step d) comprises:

d1) searching for and detecting if a carrier wave sequence exists in the received data at the predicted frame boundary immediately following the frame boundary corresponding to the unique word detected during said step c);

d2) searching for and detecting if a unique word exists in the received data at the predicted frame boundary immediately following the frame boundary corresponding to the unique word detected during said step c), if a carrier wave sequence is not detected during said step d1);

d3) searching for and detecting if a unique word exists in the received data at either one of m bit positions before or after the predicted frame boundary immediately following the frame boundary corresponding to the unique word detected during said step c), if a unique word is not detected during said step d2); and d4) repredicting the location of frame boundaries based on the frame boundary corresponding to the unique word detected during said step d3).

10. The method of frame synchronization for a superframe lock subsystem of claim 9, wherein said step d) further comprises:

d5) determining if a pattern of a unique word detected during either of said step d2) or said step d3) matches one of permitted patterns of the plurality of unique words, the patterns identifying frame type;

d6) processing frame information of the frame corresponding to the unique word detected during either of said step d2) or said step d3), in accordance with the frame type corresponding to the pattern of the unique word, upon determination during said step d5) that the pattern of the unique word matches one of the permitted patterns; and d7) processing frame information of the frame of the unique word detected during either of said step d2) or said step d3), in accordance with a frame type of a most recently processed frame, upon determination during said step d5) that the pattern of the unique word does not match one of the permitted patterns.

11. The method of frame synchronization for a superframe lock subsystem of claim 10, wherein said step d) comprises resetting a frame count to zero prior to said step d1), said step d) further comprising:

d5) incrementing the frame count subsequent processing of either of said step d6) or said step d7);

d9) determining if the incremented frame count is equal to a predetermined frame count; and d10) returning to said step d1) if the incremented frame count does not equal the predetermined frame count.

12. The method of frame synchronization for a superframe lock subsystem of claim 11, wherein said step d) further comprises:

d11) resetting the frame count upon determination in said step d9) that the incremented frame count is equal to the predetermined frame count;

d12) searching for and detecting if a carrier wave sequence exists in the received data at the predicted frame boundary immediately following the frame boundary of the frame processed during either of said step d6) or said step d7); and d13) advancing to said step e) if a carrier wave sequence is detected during said step d12).

13. The method of frame synchronization for a superframe lock subsystem of claim 12, wherein said step d) further comprises:

d14) advancing m bit positions from the predicted frame boundary immediately following the frame boundary of the frame processed during either of said step d6) or said step d7) to a new predicted frame boundary, if a carrier wave sequence is not detected during said step d12);

d15) searching for and detecting if a carrier wave sequence exists at the new predicted frame boundary;

d16) advancing to said step e) if a carrier wave sequence is detected during said step d15); and d16) repeating said step d2) and the following steps beginning at the new predicted frame boundary if a carrier wave sequence is not detected at the new predicted frame boundary.

14. The method of frame synchronization for a superframe lock subsystem of claim 1, wherein said step e) comprises repeating said step d) beginning at the predicted frame boundary immediately following the frame boundary corresponding to the CW sequence detected during said step d), upon detection that a unique word does not exist immediately following the CW sequence detected during said step d).

15. A mobile terminal receiver comprising:

correlator means for detecting the presence of unique words and carrier wave sequences in received data and for providing a correlator output indicative thereof, the received data consisting of superframes including a plurality of frames having frame information therein, a unique word in the received data being indicative of frame boundaries and a carrier wave sequence in the received data being indicative of superframe boundaries within the received data;

delay means for delaying the received data;

frame classifier means, coupled to said correlator means and said delay means, for identifying frame type of the frames of the delayed received data in accordance with the correlator output and for outputting frame type signals indicative of identified frame type;

control means for predicting frame boundaries based on a first unique word detected by said correlator means in accordance with the correlator output, for directing said correlator means to search for subsequent unique words and carrier wave sequences at the predicted frame boundaries and for generating timing signals based on the predicted frame boundaries; and frame processor means, coupled to said frame classifier means and said control means, for delaying the received data and processing the frame information of the received data thereby delayed in accordance with the timing signals and the frame type signals.

16. The mobile terminal receiver of claim 15, wherein said control means operates in
 a) an initial acquisition state for directing said correlator means to search for the first unique word in the received data,
 b) a tentative frame lock state, upon detection of the first unique word by said correlator means, for predicting frame boundaries and for directing said correlator means to search for a second unique word at a predicted frame boundary immediately following a frame boundary which corresponds to the first unique word,
 c) a frame lock state, upon detection of the second unique word by said correlator means, for directing said correlator means to search for a carrier wave sequence followed by a third unique word at a predicted frame boundary immediately following the predicted frame boundary which corresponds to the second unique word and for directing said frame processor to process frame information, and
 d) a superframe lock state, upon detection of the carrier wave sequence followed by the third unique word, for directing said correlator means to search for subsequent unique words at the predicted frame boundaries following the third unique word and for directing said frame processor to continue processing of frame information based on the detected subsequent unique words.

17. The mobile terminal receiver of claim 16, wherein during said initial acquisition state said control means directs said frame processor to process frame information based upon the first unique word detected.

18. The mobile terminal receiver of claim 16, wherein during said tentative frame lock state said control means directs said frame processor to process frame information based upon the first and second unique words detected.

19. The mobile terminal receiver of claim 15, wherein the mobile terminal receiver is a mobile telephone.

20. A superframe lock subsystem for a mobile terminal comprising:

first means for searching for and detecting a unique word in received data, the received data consisting of superframes including a plurality of frames having frame information therein, a unique word in the received data being indicative of a frame boundary;

prediction means for predicting the location of frame boundaries in the received data based upon the unique word detected by said first means;

second means for searching for and detecting if a unique word exists in the received data at the predicted frame boundary immediately following the frame boundary corresponding to the unique word detected by said first means;

third means for searching for and detecting if a carrier wave sequence exists in the received data at the predicted frame boundary immediately following the frame boundary corresponding to the unique word detected by said second means, a carrier wave sequence in the received data being indicative of a superframe boundary;

fourth means for searching for and detecting if a unique word exists in the received data immediately following the carrier wave sequence detected by said third means; and fifth means for detecting unique words subsequent the unique word detected by said fourth means and for maintaining frame synchronization based upon the unique words detected subsequent the unique word detected by said fourth means.

21. The superframe lock subsystem of claim 20, wherein the mobile terminal is a mobile telephone.

22. A superframe lock subsystem comprising:

correlator means for detecting the presence of unique words and carrier wave sequences in received data and for providing a correlator output indicative thereof, the received data consisting of superframes including a plurality of frames having frame information therein, a unique word in the received data being indicative of frame boundaries and a carrier wave sequence in the received data being indicative of superframe boundaries within the received data;

delay means for delaying the received data;

frame classifier means, coupled to said correlator means and said delay means, for identifying frame type of the frames of the delayed received data in accordance with the correlator output and for outputting frame type signals indicative of identified frame type; and control means for predicting frame boundaries based on a first unique word detected by said correlator means in accordance with the correlator output, directing said correlator means to search for subsequent unique words and carrier wave sequences at the predicted frame boundaries, generating timing signals based on the predicted frame boundaries, delaying the received data and subsequently processing the frame information of the received data as thereby delayed in accordance with the timing signals and the frame type signals.

23. The superframe lock subsystem of claim 22, wherein said control means operates in
 a) an initial acquisition state for directing said correlator means to search for the first unique word in the received data, b) a tentative frame lock state, upon detection of the first unique word by said correlator means, for predicting frame boundaries and for directing said correlator means to search for a second unique word at a predicted frame boundary immediately following a frame boundary which corresponds to the first unique word, c) a frame lock state, upon detection of the second unique word by said correlator means, for directing said correlator means to search for a carrier wave sequence followed by a third unique word at a predicted frame boundary immediately following the predicted frame boundary which corresponds to the second unique word and for directing processing of frame information, and d) a superframe lock state, upon detection of the carrier wave sequence followed by the third unique word, for directing said correlator means to search for subsequent unique words at the predicted frame boundaries following the third unique word and for directing continuing processing of frame information based on the detected subsequent unique words.

24. The superframe lock subsystem of claim 23, wherein during said initial acquisition state said control means directs processing of frame information based upon the first unique word detected.

25. The superframe lock subsystem of claim 23, wherein during said tentative frame lock state said control means directs processing of frame information based upon the first and second unique words detected.

* * * * *